(12) United States Patent
Saga et al.

(10) Patent No.: US 7,406,562 B2
(45) Date of Patent: Jul. 29, 2008

(54) INFORMATION READ/WRITE DEVICE

(75) Inventors: Hideki Saga, Tokyo (JP); Motoyasu Tsunoda, Kanagawa (JP); Terumi Takashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 275 days.

(21) Appl. No.: 11/401,724

(22) Filed: Apr. 10, 2006

(65) Prior Publication Data

US 2006/0236024 A1 Oct. 19, 2006

(30) Foreign Application Priority Data

Apr. 15, 2005 (JP) .............................. 2005-118604

(51) Int. Cl.
*G06F 13/00* (2006.01)
(52) U.S. Cl. ..................... 711/112; 711/156; 711/163; 711/172
(58) Field of Classification Search .................. 711/112, 711/156, 163, 172
See application file for complete search history.

(56) References Cited

U.S. PATENT DOCUMENTS 5,737,481 A * 4/1998 Gushima et al. ............ 386/113

FOREIGN PATENT DOCUMENTS

JP 2004-146036 5/2004

* cited by examiner

*Primary Examiner*—Reba I Elmore
(74) *Attorney, Agent, or Firm*—Townsend and Townsend and Crew LLP (57) ABSTRACT

An information read/write device has a first processor for instructing a second processor to write information onto or read information from a recording medium. The recording medium has a random access memory module which allows both processors to read or write data to the memory module. The second processor controls a scanning module for the recording medium, a write signal processing module and a read signal processing module. The read/write device is easy-to-operate while using a minimum of electric power consumption with prevention against electromagnetic interference (EMI) making the invention suitable for use in hand-held devices.

14 Claims, 6 Drawing Sheets

INFORMATION READ/WRITE DEVICE

CROSS-REFERENCES TO RELATED APPLICATIONS

This application claims priority from Japanese Patent Application No. JP2005-118604, filed Apr. 15, 2005, the entire disclosure of which is incorporated herein by reference.

BACKGROUND OF THE INVENTION

The present invention relates to information read/write devices such as magnetic disk drives or optical disk drives, and more particularly, to information read/write devices intended mainly to reduce electric power consumption.

The development of high-density recording technologies associated with magnetic disk drives, optical disk drives, and the like, has made rapid progress in recent years. In response to this, information read/write devices having capacities from at least several gigabytes to several tens of gigabytes, despite the fact that the diameters of the media used are as small as about 25 to 45 mm, have been put into practical use. These small-size large-capacity information read/write devices are now commonly used in portable computers, portable musical disc players, portable video viewers/recorders, and other application apparatus that assumes hand-held use. These types of application apparatus have their power supplies depending mainly on batteries. The capacities of existing batteries, however, are far from being up to a level at which they satisfy the nonstop operation time that the user or the application program requires. For information read/write devices and their application apparatus, therefore, enhancing the performance-power consumption ratios of these products' internal mechanisms and internal circuits is in urgent need for reduced power consumption.

Figure 1:
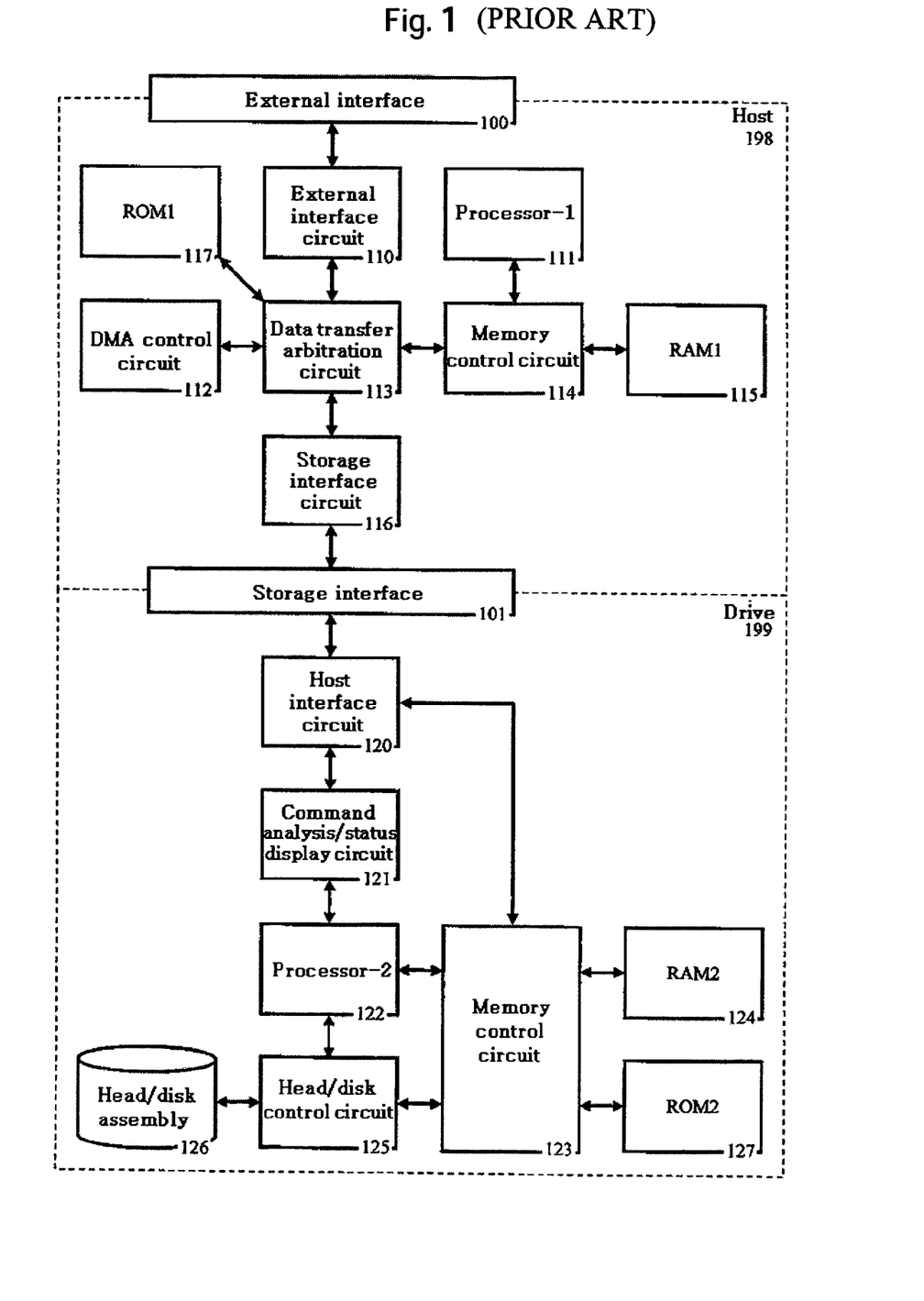
FIG. 1 is a diagram explaining a typical configuration example of an application apparatus which uses a conventional magnetic disk drive.

A typical configuration example of an application apparatus (first conventional technology) which uses a conventional magnetic disk drive is shown in FIG. 1. The application apparatus in this configuration example is broadly divided into two blocks. One of the two blocks is a drive 199 (magnetic disk drive) that receives issued commands through a storage interface 101 and operates in accordance with the received commands, and the other is a host 198 that issues commands to the drive 199. In general, the circuits of the host 198 and those of the drive 199 are mounted as independent circuit modules, which are coupled via the element, such as connector or cable, that forms part of the physical entity of the storage interface 101. Parallel ATA interface standards (these standards are disclosed in Non-Patent Document 1 (ANSI INCITS 361-2002 AT Attachment—6 with Packet Interface), for example), serial ATA interface standards (these standards are disclosed in Non-Patent Document 2 (Serial ATA: High-Speed Serialized AT Attachment Revision 1.0), for example), Small Computer System Interface (SCSI) standards (these standards are disclosed in Non-Patent Document 3 (ANSI INCITS 362-2002 Information Technology—SCSI Parallel Interface-4 (SPI-4)), for example), or the like are widely known, and proliferated, as the standards adopted for the storage interface 101. Based on these standards, the commands issued from the host 198 to the drive 199, the status data returned from the drive 199 to the host 198, the write data transferred from the internal RAM-1 115 of the host 198 to write the data onto a recording medium, and the data read out from the recording medium to store the data into the internal RAM-1 115 of the host 198, are transferred over the storage interface 101. On the storage interface 101, the rectangular-wave digital signals of relatively large amplitude that have frequencies from several tens of megahertz to several gigahertz are transmitted since rapid data transfer is requested through signal paths relatively long in transmission distance. To the internal processor-1 111 of the host 198, a drive compliant with the parallel ATA interface standards proliferating at a particularly rapid pace is mounted as one type of register file, and commands and status data are transferred in basic units of eight bits to the drive in parallel. The data read/written is also handled as access to a specific register, and 512 bytes of block data is sequentially transferred as an indivisible basic transfer unit in an 8-bit or 16-bit pattern. That is to say, the host 198 cannot make random access in units of less than 512 bytes of data to the internal RAM-2 124 of the drive 199 in any form or by any means.

The host 198 is constructed with the processor-1 111 as its central element, and the processor-1 111 mainly executes the application programs (not shown) that determine the external functions of the application apparatus. The processor-1 111 uses a memory control circuit 114 to access the RAM-1 115 or other internal resources of the host 198. Data transfer arbitration circuit 113 arbitrates data transfer between a DMA control circuit 112, an external interface circuit 110, a storage interface circuit 116, the memory control circuit 114, and a ROM-1 117. The data transfer arbitration circuit 113 also adjusts bands and latency between the above elements. The host 198 is connected to the drive 199 only via the storage interface circuit 116, and as mentioned above, the host 198 conducts control of the drive 199, based on commands and protocol specifications, through the storage interface 101. The drive 199 that undertakes a storage function in the application apparatus has a processor-2 122 different from the processor-1 111 of the host 198. The processor-2 122 mainly executes the read/write channel control programs (not shown) that have been loaded into the RAM-2 124 or a ROM-2 124, and mechanism control programs (not shown). The processor-2 122 also controls a head/disk assembly 126 through a head/disk control circuit 125. In this case, the sharable RAM-1 115 and RAM-2 124 are mounted in or on semiconductor memory elements such as dynamic RAMs (DRAMs) or static RAMs (SRAMs).

When the application apparatus is started by power-on or restarted by a resetting operation or the like, the processor-1 111 accesses the ROM-1 117 via the memory control circuit 114 and the data transfer arbitration circuit 113 and then starts executing an initializing program (not shown) that is prestored within the ROM-1 117. When the initialization of each resource within the host 198 is completed by the execution of the initializing program, the processor-1 111 attempts loading an application program from the drive 199 into the RAM-1 115 via the memory control circuit 114, the data transfer arbitration circuit 113, and the storage interface circuit 116. Instead, in an application apparatus of a larger scale, its initializing program may load an operating system program (not shown) from a drive 199 before an application program is loaded, and then the operating system program may load and execute the application program. When the host 198 starts an initializing operation, the drive 199 is also notified of this via the storage interface 101 and the drive 199 also starts an initializing operation. First, the processor-2 122 executes an initializing program (not shown) that is prestored within the ROM-2 124 and initializes each internal resource of the drive 199. Additionally, when necessary, the processor-2 122 operates the head/disk control circuit 125 and the memory control circuit 123 in accordance with the initializing program, then loads an additional program from a recording medium (not shown) into the RAM-2 124, and executes the program. When the initializing process and the loading of the additional program are completed, the drive 199 enters a stand-by state to wait for a command to be issued from the host 198.

When the initialization of both the host 198 and the drive 199 is completed, the processor-1 111 finally executes the application program that was loaded into the RAM-1 115, and issues a read command via the storage interface 101 in order to further read in only necessary data of the application program from the drive 199. In this case, instead of the read command, a write command may be issued through the storage interface 101 in order to process, and write into the drive 199, data that has been acquired from an external interface 100 through the external interface circuit 110 beforehand. The operation of each section during the issuance of the read command or of the write command is described below.

First, when a command is issued from the host 198 via the storage interface 101, a command analysis/status display circuit 121 receives the command through a host interface circuit 120. If the results of command analyses by the command analysis/status display circuit 121 and the processor-2 122 indicate that the command is a write command, the processor-2 122 instructs the memory control circuit 123 to transfer the data to be sent from the host interface 120 to the RAM-2 124. Thus, write data (not shown) is temporarily stored from the host 198 into the RAM-2 124. At this time, the DMA control circuit 112 inside the host 198 operates in accordance with an instruction from the processor-1 111 and then the write data is transferred from the RAM-1 115 via the storage interface circuit 116. Concurrently with this, the processor-2 122 instructs the head/disk control circuit 125 to conduct the positioning of a read/write head (not shown) with respect to the recording medium, setup of writing conditions, and other operations. The processor-2 122 subsequently instructs the memory control circuit 123 to transfer the write data from the RAM-2 124 to the head/disk control circuit 125, and finally, the write data is written onto (recorded on) the recording medium.

If the command analysis results indicate that the command is a read command, the processor-2 122 instructs the head/disk control circuit 125 to conduct the positioning of the read/write head with respect to the recording medium, setup of reading conditions, and other operations. The processor-2 122 also instructs the memory control circuit 123 to transfer data from the head/disk control circuit 125 to the RAM-2 124, and write data (not shown) is temporarily stored into the RAM-2 124. After storage of the write data, the processor-2 122 further instructs the memory control circuit 123 to transfer the data to be sent from the RAM-2 124 to the host interface circuit 120, and read data is sent to the host 198 via the storage interface 101. At this time, the DMA control circuit 112 inside the host 198 operates in accordance with an instruction from the processor-1 111, and finally, the read data is stored into the RAM-1 115 via the storage interface circuit 116.

Also, according to Patent Document 1 (Japanese Patent Laid-Open No. 2004-146036), the processor-1 111 within the host 198 constantly monitors the status of the application apparatus exterior via the external interface circuit 110 and the external interface 100. On detecting the occurrence of an event which requires emergency processing during the operation of the application apparatus, the processor-1 111 conducts a normal command-issuing process to issue a necessary command to the drive 119 via the memory control circuit 114, the data transfer arbitration circuit 113, and the storage interface circuit 116. That is, for example, if battery power consumption progresses and the time for which the application apparatus can operate runs short, the host 198 makes the drive 199 reliably save the important data required for application apparatus operation (e.g., metadata associated with file storage in the drive 199, operational state data on the application apparatus, data settings, and the like) on the recording medium. The host 198 also issues a stopping command to the drive 199 to retract the read/write head (moves the read/write head to a safe location free from the danger of the head being brought into contact with the recording medium by, for example, vacuum attraction, or colliding with the medium). If the physical overturn of an application system is detected, the read/write head is also retracted in the above manner.

As heretofore described, in the application apparatus employing the information read/write device based on the first conventional technology, only command issuance from the host 198, based on the specifications of the storage interface 101 has been used as a trigger for the drive 199 to conduct read/write or other operations, irrespective of the configuration of the host 198. That is, it has been necessary for the trigger to be given from the host 198 before a constituent element of the drive 199 became able to actively access an internal resources of the host 198 via the storage interface 101 (e.g., before the processor-2 122 became able to make random access to the RAM-1 115 within the host 198) or before a constituent element of the drive 199 became able to directly control the operation of the processor-1 111 within the host 198 (e.g., before the processor-2 122 became able to stop the execution of an activity/job by the processor-1 111). In addition, when the host 198 was to conduct data read/write operations on the drive 199, it has been absolutely necessary for the data transfer to be repeated twice, once between the RAM-1 115 and the RAM-2 124 and once between the RAM-2 124 and the head/disk assembly 126, with the RAM-2 in between.

BRIEF SUMMARY OF THE INVENTION

As described above, in the environment where the usable quantity of electrical energy is limited as in a hand-held device powered from a battery, in particular, it is particularly important to reduce electric power consumption in an entire application apparatus without deteriorating its performance or function. To reduce only energy consumption with performance and function being maintained, however, it is necessary, in the case of a machine mechanism, to reduce components in size, weight, and loss, or in the case of a circuit mechanism, to miniaturize circuit element processes and to reduce voltages or modify the operating principles themselves of elements. Also, partly because immediately enhancing a performance-power consumption ratio by using these methods has its limits, such reduction in energy consumption is very difficult to implement at once. In addition, in the field of hand-held devices, since the weight and physical size of the application apparatus itself has important impacts on its operational convenience, reduction in the apparatus weight and size exists as one of the important problems to be solved. Furthermore, cost reduction of the application apparatus is also a general important problem to be solved.

In the first conventional technology, however, no special measures are provided to improve the performance-power consumption ratio or to reduce weight, size, or costs. Problems due to limits on continuous operation time or an increase in battery capacity, such as reduced convenience and increased weight, physical size, and costs of the application apparatus, have therefore existed in the environment with the limited power supply capacities of battery power supplies and the like.

Also, in the first conventional technology, the necessity for the host 198 and the drive 199 to have the ROM-1 117 and ROM-2 124 for storage of the respective initializing programs, and the RAM-1 115 and RAM-2 124 for storage of data and a part of an application program, has increased the total number of components in the application apparatus, thus presenting problems in terms of total apparatus costs, power consumption, and size.

Additionally, in the first conventional technology, it has been necessary to write information using the two-step procedure that includes copying data temporarily from the RAM-1 115 into the RAM-2 124 and further transferring a copy of the data from the RAM-2 124 to the head/disk assembly 126. Conversely, to read information, it has been necessary to use the two-step procedure that includes storing temporarily the data that has been read out from the recording medium, into the RAM-2 124 and further transferring the data to the RAM-1 115. For these operational and compositional reasons, essentially the same data has needed to occupy two different RAMs at the same time, and greater processing capabilities each of the processor-1 111, the processor-2 122, and the data transfer data, have been required for particular data transfer processing. These have posed problems in terms of application apparatus costs, power consumption, and size. Additionally, since rectangular-wave digital signals of relatively large amplitude and high speed pass through on the storage interface 101 during data transfer between the RAM-1 115 and the RAM-2 124, this has been extremely disadvantageous in terms of electromagnetic interference (EMI) suppression.

According to Patent Document 1 (second conventional technology), even if the event, such as the overturn of an application apparatus, that requires emergency processing is detected by a host 198, when a storage interface 101 is being occupied by data transfer, a new command must be issued after the storage interface 101 has been released following completion of the data transfer. There has been the problem, therefore, that the possible delay in emergency processing by a drive 199 may result in important data being lost or a head/disk assembly being physically damaged.

For the "magnetic disk drive" in Japanese Patent Laid-Open No. 2002-100180 (third conventional technology), the technology is disclosed that moves a read/write head to a retrocession region in the magnetic disk drive not via a host. In the third conventional technology, the above problem with the second conventional technology can be avoided since the drive can conduct emergency processing at its own discretion without waiting for the storage interface to be released. There has been the possibility, however, that even when emergency processing is executed, the host cannot detect this and thus a mismatch arises during subsequent control of the magnetic drive by the host. Additionally, since the drive cannot recognize the importance of data to be written, there has been the problem that the drive cannot distinguish between data whose writing is abortable, and data to be preferentially written, and thus that truly important data is not likely to be writable.

Therefore, with a view to solve these problems not completely soluble with the foregoing conventional technologies, the present invention provides an information read/write device that includes: a first processor; a second processor; a recording medium to retain information using a distribution of physical states; a recording module for inciting changes in local physical state of the recording medium; a reading module for detecting the local physical state of the recording medium; a scanning module for scanning a desired position on the recording medium via the recording module and the reading means; a write signal processing module for generating a driving signal for the recording module by providing information to be written, with required processing; a read signal processing module for restoring read information to its original form by providing the signal obtained from the reading module, with processing inverse to that provided by the write signal processing means; a memory module random-accessible from the first processor and the second processor; and a memory control circuit to arbitrate access requests from the first and second processors to the memory module and conduct access processing with respect to the memory module.

In the information read/write device, the first processor instructs the second processor to write information onto, or read information from, the recording medium, and the second processor controls the scanning module, the write signal processing module, and the read signal processing module, whereby the information to be written or the read information is stored into the memory module.

Desirably, the information read/write device is adapted so that the first processor, the second processor, the memory control circuit, the write signal processing module, and the read signal processing module are mounted on one circuit substrate or in one package.

According to the present invention, since the number of components, including memory elements, in an application apparatus of an information read/write device, and capacities of the memory elements are reduced and since the number of data transfer operations in the application apparatus is also reduced, not only the processors forming part of the application apparatus but also data transfer paths can be reduced in throughput. These reductions provide advantages in terms of cost, electric power consumption, and size. Also, since rectangular-wave digital signals that are relatively large in amplitude and high in transfer rate do not require routing via a storage interface, this also provides an advantage in terms of EMI suppression. Additionally, even when an event is detected that requires emergency processing such as device protection or data protection, it is possible to immediately protect mechanisms without waiting for the storage interface to be released, and to write data in conformity with the priority level of the data while recognizing the priority level. It is therefore possible to reduce the likelihood of problems such as damage to a device, a failure in the writing of truly important data, or the instability of the application apparatus after emergency processing.

BRIEF DESCRIPTION OF THE DRAWINGS

FIGS. 3(*a*) to 3(*c*) are diagrams explaining an example of command issuance by the processor-1 211 in the information read/write device described using FIG. 2.

DETAILED DESCRIPTION OF THE INVENTION

Specific embodiments of the present invention will be described in detail below using the accompanying drawings. The following description of configuration examples assumes a magnetic disk drive as an example of an information read/write device. Application of the present invention, however, is not limited to a magnetic disk drive, and advantageous effects of the invention can be obtained even by applying a technology thereof to other information read/write devices such as an optical disk drive and magnetic tape drive.

First Embodiment

Figure 2:
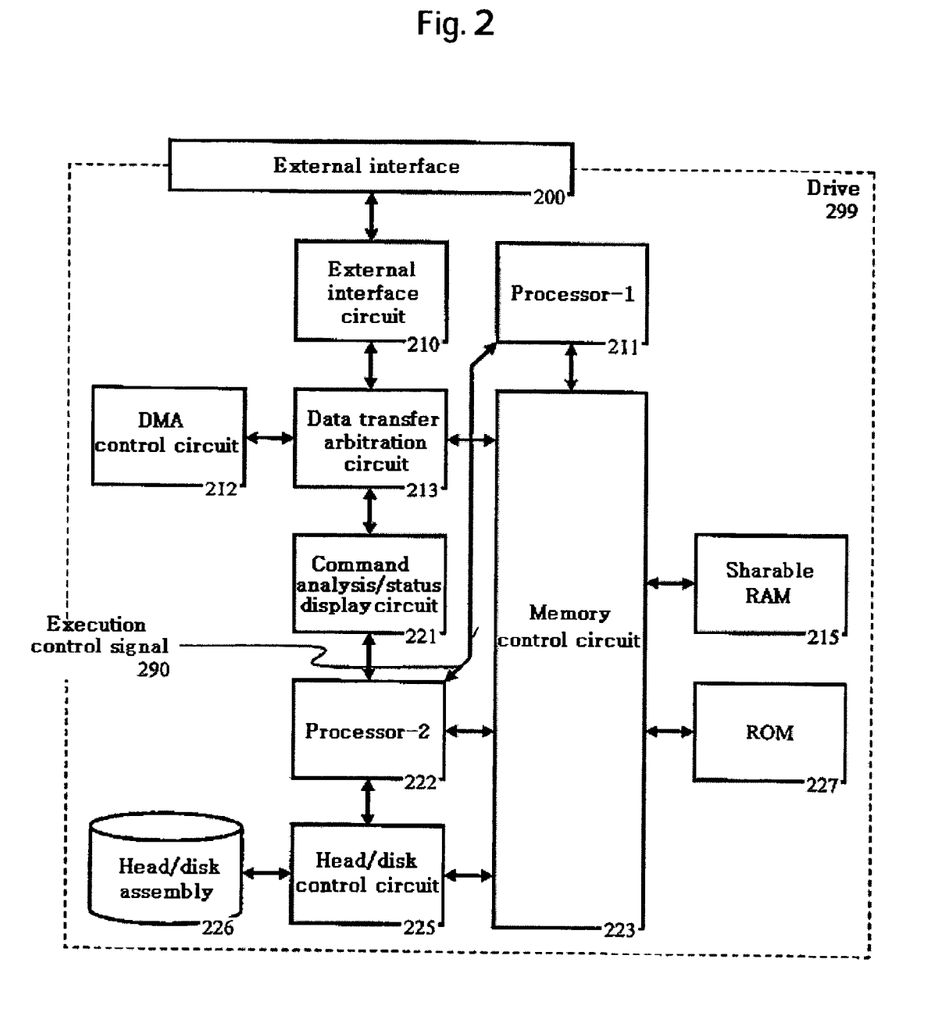
FIG. 2 is a diagram explaining a first configuration example of an information read/write device which uses a technology according to the present invention.

FIG. 2 is a diagram explaining a first configuration example of an information read/write device which uses a technology according to the present invention. In a drive 299, a processor-1 211 mainly executes the application programs (not shown) that are prestored within a sharable RAM-215, and determines external functions of the drive 299 (i.e., the functions that use an external interface 200). Also, a processor-2 222 mainly executes the read/write channel control program (not shown) and mechanism control program (not shown) that are prestored within a ROM 227, and controls a head/disk assembly 226 through a head/disk control circuit 225. In addition, the processor-1 211 and the processor-2 222 can make random access to the sharable RAM-215 and the ROM 227, respectively, through a memory control circuit 223, and both processors exchange operational information and other information between each other through the sharable RAM-215.

The sharable RAM-215 may have all its regions shared between the processor-1 211 and the processor-2 222 or may have a region random-accessible from both processors, and a region accessible only from either one of the two processors. Also, the processor-1 211 may be adapted to have random accessibility to the ROM 227. These are common in the following description. The "sharable RAM" in the following description refers to a RAM region random-accessible from both the processor-1 211 that mainly executes application programs, and the processor-2 222 that mainly executes the read/write channel control program and the mechanism control program. Additionally, while an entity of the sharable RAM itself means a semiconductor memory element such an SRAM or DRAM, the kind of element is not limited only to such a semiconductor memory and may be an electronic circuit-based memory element such as a magnetoresistive RAM (MRAM) or phase change memory.

The head/disk assembly 226 includes a disk-like recording medium (not shown), a read/write head (not shown), and a scanning element (not shown) that can scan any position on the recording medium by means of the read/write head. The sharable RAM-215 and the ROM 227 are connected to the memory control circuit 223, which arbitrates access requests from the processor-1 211, the processor-2 222, and a data transfer arbitration circuit 213, to the sharable RAM-215 and the ROM 227, and conducts actual access processes. The data transfer arbitration circuit 213 arbitrates access requests from the memory control circuit 223 and a DMA control circuit 212, and adjusts mutual communications bands and latency. In accordance with a request from the processor-1 211 or the like, an external interface circuit 210 outputs data from the drive 299 to an external device (not shown) connected to the external interface 200, or conversely, acquires signal information from the external device into the drive 299.

When the drive 299 is started by power-on or restarted by a resetting operation or the like, the processor-2 222 accesses the ROM 227 via the memory control circuit 223 and starts executing an initializing program (not shown) that is prestored within the ROM 227. At this time, electric power to the processor-1 211 is suppressed since execution of an instruction by the processor-1 211 is stopped by the execution control signal 290 sent from the processor-2 222. A usable method of stopping an instruction execute operation of the processor-1 211 is by, for example, stopping clock signal application to the processor-1 211 or forcibly executing a stopping instruction using a masking prohibition interrupt signal. However, other methods may be usable instead.

When initialization of internal resources of elements such as a command analysis/status display circuit 221 and the head/disk control circuit 225 is completed by execution of the initializing program by the processor-2 222, an application program for the processor-1 211, pre-recorded in a required position on the recording medium, is loaded from the head/disk assembly 226 into the sharable RAM-215 by the processor-2 222. Next, the processor-2 222 checks contents of the application program and verifies that this program is a valid program which the processor-1 211 can execute. When the application program is successfully loaded and its validity is confirmed, the processor-2 222 restarts the instruction execute operation of the processor-1 211 through the execution control signal 290 for the processor-1 211. The execution of the application program is thus started.

In this case, depending on the contents of the application program, the processor-1 211, after processing the signal information that has been acquired from the external interface 200 through the external interface circuit 210, writes the signal information onto the recording medium, or after processing the information that has been read out from the recording medium, outputs the information to the external interface 200 through the external interface circuit 210. Additionally, a user command within the drive 299 may be acquired through the external interface 200 and operation of the application program may be subject to a change or the like in accordance with the user command.

If, for some reason, the processor-2 222 has failed to load the application program or has been unable to confirm the validity of the application program, the processor-2 222 leaves the instruction execute operation of the processor-1 211 in a stopped state. At the same, the processor-2 222 stops operation of the head/disk assembly 226 through the head/disk control circuit 225, thus stopping operation of the entire drive 299.

During the execution of its application program, the processor-1 211 uses the following operation sequence to read data from the recording medium into the sharable RAM-215. That is, the processor-1 211 issues a recording-medium data read command to the command analysis/status display circuit 221 through the memory control circuit 223 and the data transfer arbitration circuit 213. The read command contains information such as a position on the recording medium where the data to be read out is stored, a size of the data, and a physical address within the sharable RAM-215 where the data is to be read out. The command analysis/status display circuit 221 and the processor-2 222 analyze the issued command and calculate a physical position on the recording medium where the data to be read out exists.

In accordance with analysis and calculation results, the processor-2 222 operates to move the read/write head to a desired position on the recording medium through the head/disk control circuit 225. At the same time, the processor-2 222 notifies the memory control circuit 223 of the physical address within the sharable RAM-215 where the data read out is to be stored. After a while, when the read/write head arrives at the desired position on the recording medium, a reading element within the read/write head outputs a distribution of directions of magnetization on the recording medium, as read signals (not shown). These read signals, after undergoing a required decoding process, error detection/correction, and/or other processing in the head/disk control circuit 225, are sequentially transferred to the memory control circuit 223 and stored as read data into a specified address range of the sharable RAM-215. After the data has been completely stored into the sharable RAM-215, the processor-2 222 uses the command analysis/status display circuit 221 to make a display to the effect that data reading has been completed. When this display is recognized by the processor-1 211, the reading operation is completed.

The processor-1 211 uses the following operation sequence to write data from the sharable RAM-215 onto the recording medium during the execution of the application program. That is, the processor-1 211 issues a recording-medium data write command to the command analysis/status display circuit 221 through the memory control circuit 223 and the data transfer arbitration circuit 213. The write command contains information such as a physical address within the sharable RAM-215 where the data to be written is stored, a size of the data, and a position on the recording medium where the data is to be written. The command analysis/status display circuit 221 and the processor-2 222 analyze the issued command and calculate a physical position on the recording medium where the data is to be written.

In accordance with analysis and calculation results, the processor-2 222 operates to move the read/write head to a desired position on the recording medium through the head/disk control circuit 225. At the same time, the processor-2 222 notifies the memory control circuit 223 of the physical address within the sharable RAM-215 where the data to be written is stored. After a while, when the read/write head arrives at the desired position on the recording medium, the data to be written is sequentially transferred from the sharable RAM-215 through the memory control circuit 223 to the head/disk control circuit 225. Inside the head/disk control circuit 225, the data to be written undergoes processing such as a required coding process and/or an error detection/correction information adding process. The data is further converted into write signals (not shown), then supplied to a writing element within the read/write head, and written onto the desired position of the recording medium as a distribution of directions of magnetization. When data writing onto the recording medium is completed, the processor-2 222 uses the command analysis/status display circuit 221 to make a display to the effect that data writing has been completed. When this display is recognized by the processor-1 211, the writing operation is completed.

According to the above configuration and operation, since the number of components in the application apparatus of the information read/write device and memory capacities are reduced and since the number of data transfer operations in the application apparatus is also reduced, not only the processors forming part of the application apparatus but also data transfer paths can be reduced in throughput. These reductions provide advantages in terms of cost, electric power consumption, and size. Also, mounting the processor-1 211, the processor-2 222, the memory control circuit 223, and the head/disk control circuit 225, desirably, on one circuit substrate, or further desirably, in one package, makes it unnecessary for rectangular-wave digital signals of relatively large amplitude and high speed to be routed via a storage interface. A great advantage in terms of EMI suppression is also provided as a result.

Additionally, during execution of an application program, the processor-1 211 constantly monitors an external status of the drive 299 via the external interface circuit 210 and the external interface 200. On detecting an event that requires emergency processing, the processor-1 211 notifies this emergency to the processor-2 222 via the execution control signal 290, not through a normal command issuance route. Such notification from the processor-1 211 to the processor-2 222 via the execution control signal 290 uses an interrupt signal or the like.

The processor-2 222, when notified of the emergency, immediately brings a read/write command of low importance into a temporarily stop if this command is undergoing processing. Next, the processor-2 222 saves on the recording medium the important data necessary for the operation of the application apparatus, prestored in a required region of the sharable RAM-215, or starts a process for retracting the read/write head.

To save important data on the recording medium, first, the processor-2 222 directly reads information such as a physical address within the sharable RAM-215 where the data to be saved is stored, a size of the data to be written (saved), and a position on the recording medium where the data is to be written, from a work area of the processor-1 211, within the sharable RAM-215, via the memory control circuit 223. Next, the processor-2 222 calculates the physical position on the recording medium where the data is to be written. In accordance with calculation results, the processor-2 222 operates to move the read/write head to a desired position on the recording medium through the head/disk control circuit 225. At the same time, the processor-2 222 notifies the memory control circuit 223 of the physical address within the sharable RAM-215 where the data to be written is stored. After a while, when the read/write head arrives at the desired position on the recording medium, the data to be written is sequentially transferred from the sharable RAM-215 through the memory control circuit 223 to the head/disk control circuit 225. Inside the head/disk control circuit 225, the data to be written (recorded) undergoes processing such as a required coding process and/or an error detection/correction information adding process. The data is further converted into write signals, then supplied to the writing element within the read/write head, and written onto the desired position of the recording medium as the distribution of directions of magnetization. In a retraction process for the read/write head, the processor-2 222 orders the head/disk control circuit 225 to operate the head/disk assembly 226, whereby the read/write head is moved to a safe position.

According to the above configuration and operation, even when an event is detected that requires emergency processing such as device protection or data protection, it is possible to immediately protect mechanisms without waiting for the storage interface to be released. It is also possible for the processor-2, by referring to the work area of the processor-1 that exists within the sharable RAM-215, to write data in conformity with the priority level of the data while recognizing the priority level. It is therefore possible to avoid the occurrence of problems such as a failure in writing of truly important data or mismatching in apparatus operation during application program execution.

Figure 3:
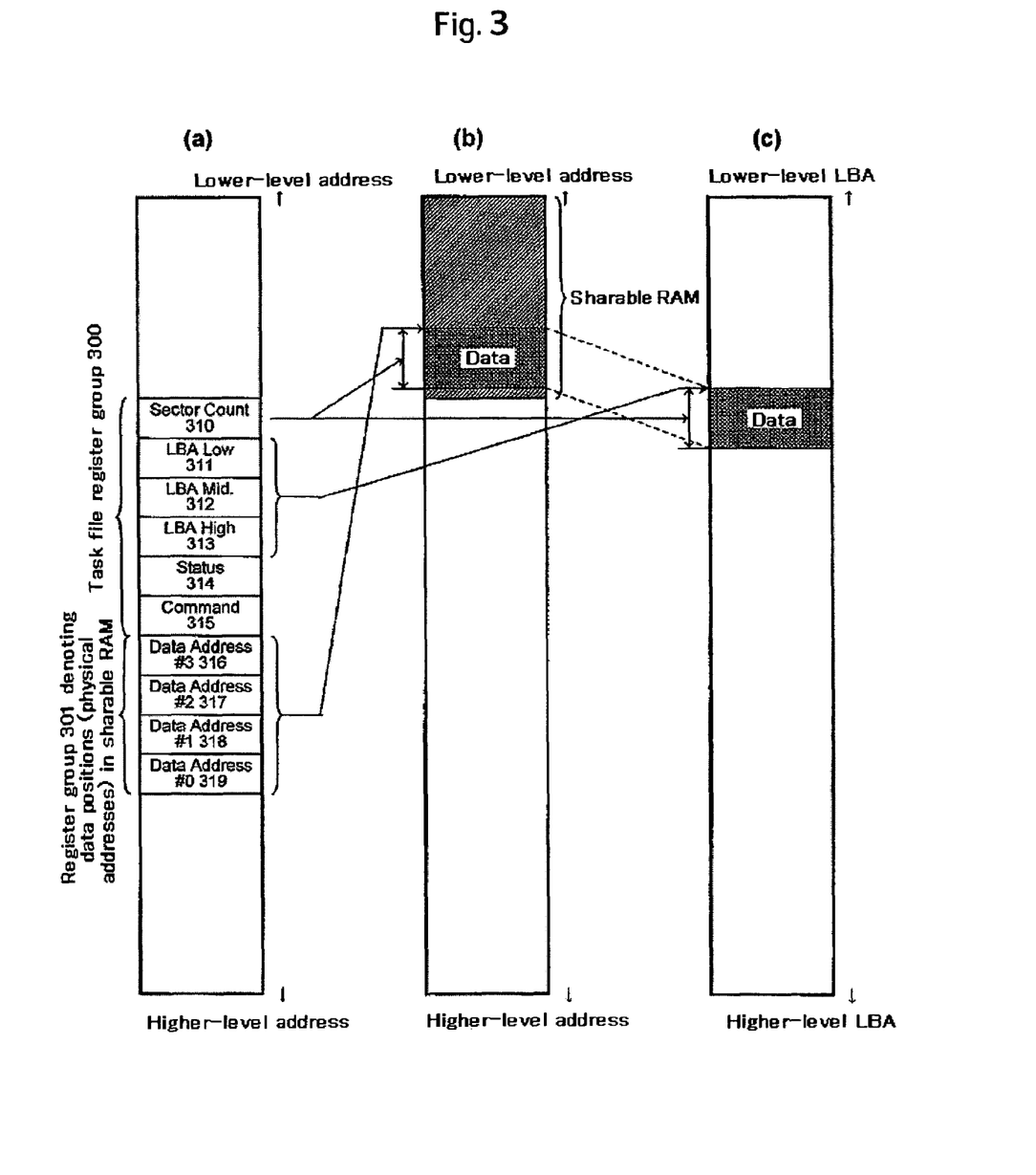

FIGS. 3(a) to 3(c) are diagrams explaining an example of command issuance by the processor-1 211 in the information read/write device described using FIG. 2. The explanation below assumes that in the drive 299, the processor-1 211 is a processor core of an architecture with an independent I/O space in addition to a memory space.

FIG. 3(a) shows an arrangement of registers on a logical I/O space of the processor-1 211. In this figure, lower-level addresses are shown in upper positions, and higher-level addresses, in lower positions. Two register groups are mapped on the logical I/O space. One is a task file register group 300 consisting of six 8-bit-wide registers (a Sector Count register 310, an LBA Low register 311, an LBA Mid. register 312, an LBA High register 313, a Status register 314, and a Command register 315). The other is a register group 301 that denotes data positions (physical addresses) within the sharable RAM-215 (the register group 301 consists of four 8-bit registers: Data Address #3 316, Data Address #2 317, Data Address #1 318, and Data Address #0 319). Access to either of these registers during application program execution is equivalent to access to the command analysis/status display circuit 221 via the memory control circuit 223 and the data transfer arbitration circuit 213 by the processor-1 211 in the circuit block of FIG. 2.

FIG. 3(b) shows a storage status of read/write data on a logical memory space of the processor-1 211. On the logical memory space, a required region from the lowest-level address is mapped in the sharable RAM-215 and includes an empty region for storage of data to be written onto the recording medium, or of data that has been read out from the recording medium. This figure assumes that in the logical memory space of the processor-1 211, logical addresses of the sharable RAM-215 agree with physical addresses in an access bus of the processor-1 211. Also, the important data itself that is required for application apparatus operation, a physical address at which the important data is stored, a size of data to be written in case of the above-mentioned emergency, a position on the recording medium where the data is to be written, an importance level of the important data, and other information are stored in the work area of the sharable RAM-215 that is reserved for application program execution by the processor-1 211. FIG. 3(c) shows a storage status of data on a logical block address (LBA) space of the recording medium.

On the logical I/O space of the processor-1 211, the Command register 315 is used for the processor-1 211 to issue a command concerned with read/write operations, to the command analysis/status display circuit 221. The Status register 314 is used to confirm, prior to command issuance through the Command register 315, whether the command is in an issuable state, or to confirm, after command issuance, whether the command has been properly processed to completion. The Sector Count register 310 is used to specify, in sector units having a size of 512 bytes, either the amount of data to be written from the sharable RAM-215 onto the recording medium using a write command, or the amount of data to be read out from the recording medium into the sharable RAM-215 using a read command.

The LBA High register 313, the LBA Mid. register 312, and the LBA Low register 311 are coupled in order and used as a 24-bit register to specify a position on the LBA space of the recording medium where data is to be written thereonto or read out therefrom, by use of the write or read command. The Data Address #0 register 319, the Data Address #1 register 318, the Data Address #2 register 317, and the Data Address #3 register 316 are coupled in order and used as a 32-bit register to specify a first physical address of the data to be written using the write command, within the sharable RAM-215, or a first physical address of the data to read out using the read command, within the sharable RAM-215.

To write data onto the recording medium, the processor-1 211 provides the data to be written, in the sharable RAM-215, and then after reading out contents of the Status register 314, confirms that a new command can be issued. If a new command cannot be issued, the processor-1 211 waits for the issuance to become possible. After this, the processor-1 211 writes a first physical address of data to be written, from the sharable RAM-215 into the Data Address #0 register 319, the Data Address #1 register 318, the Data Address #2 register 317, or the Data Address #3 register 316. The processor-1 211 further writes the amount of data to be written, into the Sector Count register 310, and the position on the LBA space of the recording medium where the data is to be written, into the LBA High register 313, the LBA Mid. register 312, or the LBA Low register 311. Finally, the processor-1 211 writes the write command into the Command register 315, thus completing issuance of the write command.

As described heretofore, when the write command is issued, the command analysis/status display circuit 221 and the processor-2 222 analyze command contents and then the processor-2 222 operates the head/disk control circuit 225, the head/disk assembly 226, and/or the memory control circuit 223 as appropriate, whereby desired data is written from the sharable RAM-215 onto the recording medium.

To read out data from the recording medium, the processor-1 211 reserves an empty region for reading out the data into the sharable RAM-215, and then after reading the contents of the Status register 314, confirms whether a new command can be issued. If a new command cannot be issued, the processor-1 211 waits for the issuance to become possible. If a new command can be issued, the processor-1 211 writes a first physical address of data to be read out, into the Data Address #0 register 319, the Data Address #1 register 318, the Data Address #2 register 317, or the Data Address #3 register 316. The processor-1 211 further writes the amount of data to be read out, into the Sector Count register 310, and the position on the LBA space of the recording medium where the data is written, into the LBA High register 313, the LBA Mid. register 312, or the LBA Low register 311. Finally, the processor-1 211 writes the read command into the Command register 315, thus completing issuance of the read command. As described heretofore, when the read command is issued, the command analysis/status display circuit 221 and the processor-2 222 analyze command contents and then the processor-2 221 operates the head/disk control circuit 225, the head/disk assembly 226, and/or the memory control circuit 223 as appropriate, whereby the desired data existing on the recording medium is transferred to the specified region within the sharable RAM-215.

Second Embodiment

Figure 4:
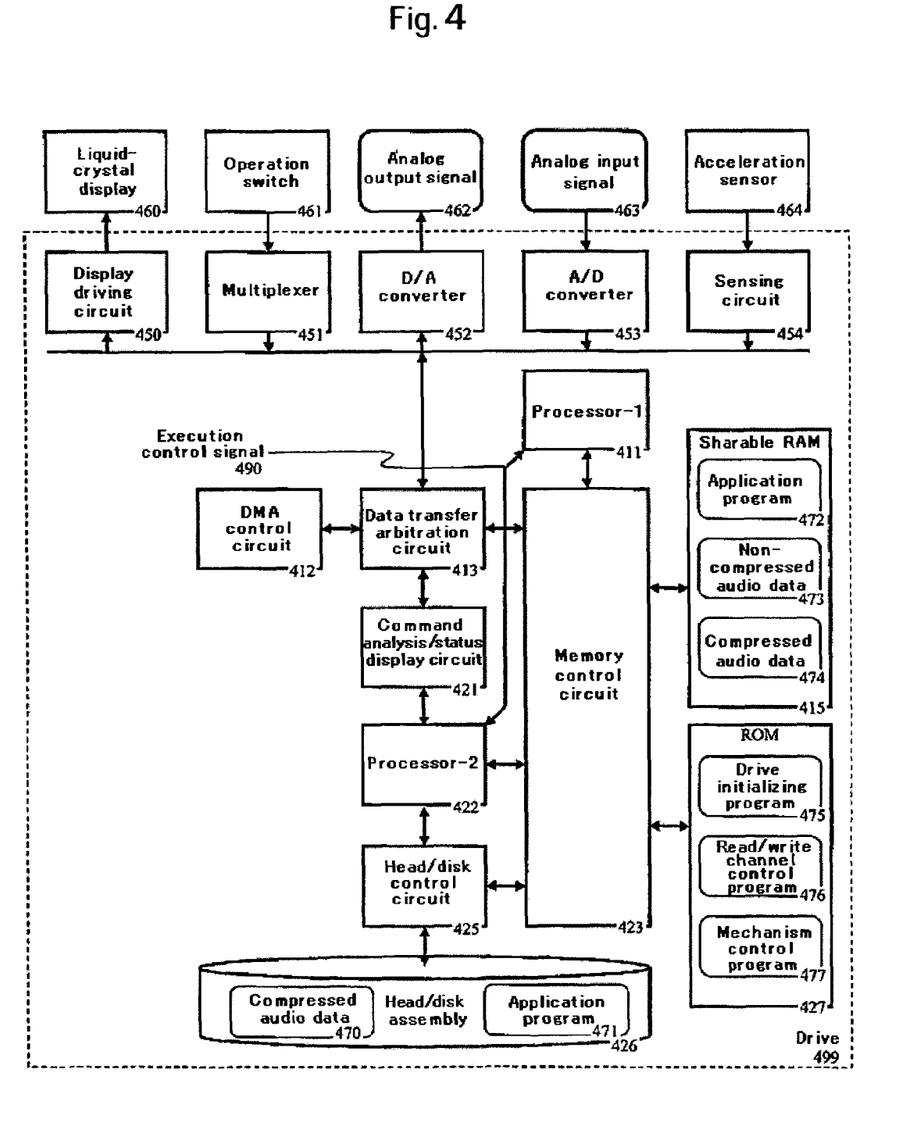
FIG. 4 is a diagram explaining a more specific second configuration example of an information read/write device, based on the configuration described using FIG. 2.

FIG. 4 is a diagram explaining a more specific second configuration example of an information read/write device, based on the configuration described using FIG. 2. A drive 499 in the present second configuration example has a status display function based on a liquid-crystal display 460. The drive 499 assumes a so-called "voice recorder" for compressing analog input signals 463 such as audio signals, and then saving these signals as compressed audio data 470 on a recording medium (not shown), or for decompressing the compressed audio data 470 that was saved on the recording medium, and then reading the data 470 as analog output signals 462.

Operation of a processor-1 411 and that of a processor-2 422 are basically as described in the first embodiment, and the processor-1 411 executes an application program 472 that the processor-2 422 has read out from the recording medium into a sharable RAM 415. The application program 472 includes various functions. For example, these functions mainly include: a function that monitors user operations of an operation switch 461 via a multiplexer 451, a function for controlling a display-driving circuit 450 and activating the liquid-crystal display 460 to display an operating status of the drive 499 and the messages directed to a user, a function for compressing the analog input signals 463 obtained via an A/D converter 453, and then saving these signals as compressed audio data 470 on the recording medium, and a function that reads out compressed audio data 470 from the recording medium, then decompresses the data, and outputs the data as analog output signals 462 via a D/A converter 452.

The application program 472 that the processor-1 411 is to execute is stored into the sharable RAM 415. Compressed audio data 474 that is to be written onto the recording medium or that has been read out therefrom, non-compressed audio data 473 that is not yet compressed or that has already been decompressed, and other data are also stored into the sharable RAM 415. A drive-initializing program 475 provided for the processor-2 422 to initialize various internal resources of the drive 499 during initialization of the drive 499 itself and then read out an application program 471 into the sharable RAM 415, is stored in a ROM 427. A read/write channel control program 476 and a mechanism control program 477, both provided for the processor-2 422 to control a head/disk assembly 426 through a head/disk control circuit 425, are also stored in the ROM 427.

When audio recording is specified with the operation switch 461 by the user, the processor-1 411 that was scanning the operation switch 461 via the multiplexer 451 detects the specification of audio recording and instructs a DMA control circuit 412 to store outputs of the A/D converter 453 into the sharable RAM 415 at required time intervals. After a while, when a desired amount of non-compressed audio data 473 is stored into the sharable RAM 415, the processor-1 411 starts an compressing operation to generate compressed audio data 474. Next, the processor-1 411 issues a write command to a command analysis/status display circuit 421 through a memory control circuit 423 and a data transfer arbitration circuit 413 so that the compressed audio data 474 will be written onto the recording medium. After receiving this write command, the processor-2 422 operates the head/disk control circuit 425 and the memory control circuit 423 so as to write the compressed audio data 474 within the sharable RAM 415 onto the recording medium.

When audio reproduction is specified with the operation switch 461 by the user, the processor-1 411 that was scanning the operation switch via the multiplexer 451 detects the specification of the reproduction and issues a read command to the command analysis/status display circuit 421 through the memory control circuit 423 and the data transfer arbitration circuit 413. After receiving this write command, the processor-2 422 operates the head/disk control circuit 425 and the memory control circuit 423 so as to read the compressed audio data 470, written onto the recording medium, into the sharable RAM 415. The compressed audio data 474 that has been read out into the sharable RAM 415 is decompressed into non-compressed audio data 473 by the processor-1 411. Simultaneously with this, the processor-1 411 transfers the non-compressed audio data 473 within the sharable RAM 415 to the D/A converter 452 at required time intervals and instructs the DMA control circuit 412 to output the above data 473 as analog output signals 462.

Additionally, the processor-1 411, by executing the application program 472, constantly monitors, through the memory control circuit 423, the data transfer arbitration circuit 413 and a sending circuit 454,a magnitude of the gravitational acceleration that the information read/write device, namely, the drive 499 feels by means of an acceleration sensor 464. If the gravitational acceleration detected by the acceleration sensor 464 is smaller than a required value, the processor-1 411 interprets this state as an overturn of the drive 499, and sends an execution control signal 490 to the processor-2 422 to notify it of the fact that an emergency has occurred. The processor-2 422, after being notified of the emergency, immediately brings a read/write command of low importance (e.g., a command for reading out a body of the compressed audio data 470) into a temporary stop if that command is undergoing processing. Next, the processor-2 422 starts a process for retracting a read/write head. That is to say, since the processor-2 422 orders the head/disk control circuit 425 to operate the head/disk assembly 426 and thus the read/write head is moved to a safe position, the possibility of the disk/disk assembly 426 being damaged by a physical shock of its overturn is reduced significantly.

Third Embodiment

Figure 5:
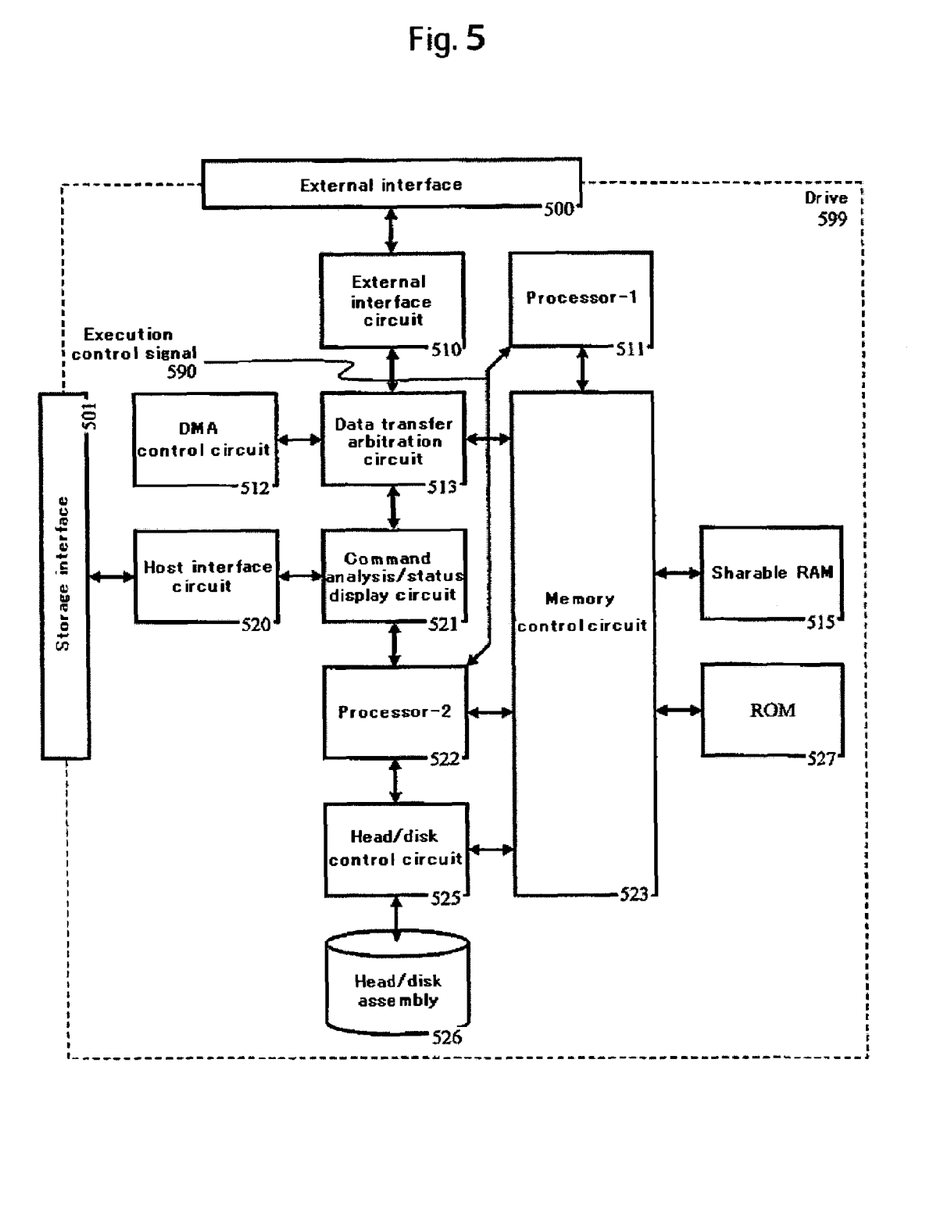
FIG. 5 is a diagram explaining a third configuration example of an information read/write device which uses the technology according to the present invention.

FIG. 5 is a diagram explaining a third configuration example of an information read/write device which uses the technology according to the present invention. In a drive 599, a processor-1 511 mainly executes the application programs (not shown) that are prestored within a sharable RAM 515, and determines external functions of the drive 599. Also, a processor-2 522 mainly executes the read/write channel control program (not shown) and mechanism control program (not shown) that are prestored within a ROM 527, and controls a head/disk assembly 526 through a head/disk control circuit 525. In addition, the processor-1 511 and the processor-2 522 can make random access to the sharable RAM 515 and the ROM 527, respectively, through a memory control circuit 523, and both processors exchange operational information and other information between each other through the sharable RAM 515. The head/disk assembly 526 includes a disk-like recording medium (not shown), a read/write head (not shown), and a scanning element (not shown) that can scan any position on the recording medium by means of the read/write head.

The sharable RAM 515 and the ROM 527 are connected to the memory control circuit 523, which arbitrates access requests from the processor-1 511, the processor-2 522, and a data transfer arbitration circuit 513, to the sharable RAM 515 and the ROM 527, and conducts actual access processes. The data transfer arbitration circuit 513 arbitrates access requests from the memory control circuit 523 and a DMA control circuit 512, and adjusts mutual communications bands and latency. In accordance with a request from the processor-1 511 or the like, an external interface circuit 510 outputs data from the drive 599 to an external device (not shown) connected to an external interface 500, or conversely, acquires signal information from the external device into the drive 599. A command analysis/status display circuit 521 has two ports for command input and status display and is adapted to selectively process either a command issued from the processor-1 511 via the data transfer arbitration circuit 513, or a command issued from an external host device (not shown) that is connected to a storage interface 501 via a host interface 520. Either one of the above two elements that issue, commands acceptable by the command analysis/status display circuit 521 is selected by the processor-2 522 when a required selection command is received.

When the drive 599 is started by power-on or restarted by a resetting operation or the like, the processor-2 522 accesses the ROM 527 via the memory control circuit 523 and starts executing an initializing program (not shown) that is prestored within the ROM 527. At this time, the processor-1 511 has its instruction execution operation stopped by transmission of the execution control signal 590 sent from the processor-2 522. When initialization of internal resources of elements such as the command analysis/status display circuit 521 and the head/disk control circuit 525 is completed by the execution of the initializing program by the processor-2 522, an application program for the processor-1 511, pre-recorded in a required position on the recording medium, is loaded into the sharable RAM 515 by the processor-2 522. Next, the processor-2 522 verifies that the application program is a valid program which the processor-1 511 can execute. When the application program is successfully loaded and its validity is confirmed, the processor-2 522 activates the processor-1 511 to restart its instruction execute operation through the execution control signal 590 for the processor-1 511. The processor-1 511 then starts executing the application program that has been loaded into the sharable RAM 515. In this case, depending on particular contents of the application program, the processor-1 511, after processing the signal information that has been acquired from the external interface 500, writes the signal information onto the recording medium, or after processing the information that has been read out from the recording medium, outputs the information through the external interface 500. Additionally, a user command within the drive 599 may be acquired through the external interface 500 and operation of the application program may be subject to a change or the like in accordance with the user command.

The processor-1 511 uses the following operation sequence to read data from the recording medium into the sharable RAM 515 during the execution of the application program. That is, the processor-1 511 issues a recording-medium data read command to the command analysis/status display circuit 521 through the memory control circuit 523 and the data transfer arbitration circuit 513. The read command contains information such as a position on the recording medium where the data to be read out is stored, a size of the data, and a physical address within the sharable RAM 515 where the data is to be read out. The command analysis/status display circuit 521 and the processor-2 522 analyze the issued command and calculate a physical position on the recording medium where the data to be read out exists.

In accordance with analysis and calculation results, the processor-2 522 operates to move the read/write head to a desired position on the recording medium through the head/disk control circuit 525. At the same time, the processor-2 522 notifies the memory control circuit 523 of the physical address within the sharable RAM 515 where the data read out is to be stored. After a while, when the read/write head arrives at the desired position on the recording medium, a reading element within the read/write head outputs a distribution of directions of magnetization on the recording medium, as read signals (not shown). These read signals, after undergoing a required decoding process, error detection/correction, and/or other processing in the head/disk control circuit 525, are sequentially transferred to the memory control circuit 523 and stored as read data into a desired address range of the sharable RAM 515. After the data has been completely stored into the sharable RAM 515, the processor-2 522 uses the command analysis/status display circuit 521 to make a display to the effect that data reading has been completed. When this display is recognized by the processor-1 511, the reading operation is completed.

The processor-1 511 uses the following operation sequence to write data from the sharable RAM 515 onto the recording medium during the execution of the application program. That is, the processor-1 511 issues a recording-medium data write command to the command analysis/status display circuit 521 through the memory control circuit 523 and the data transfer arbitration circuit 513. The write command contains information such as a physical address within the sharable RAM 515 where the data to be written is stored, a size of the data, and a position on the recording medium where the data is to be written. The command analysis/status display circuit 521 and the processor-2 522 analyze the issued command and calculate a physical position on the recording medium where the data is to be written.

In accordance with analysis and calculation results, the processor-2 522 operates to move the read/write head to a desired position on the recording medium through the head/disk control circuit 525. At the same time, the processor-2 522 notifies the memory control circuit 523 of the physical address within the sharable RAM 515 where the data to be written is stored. After a while, when the read/write head arrives at the desired position on the recording medium, the data to be written is sequentially transferred from the sharable RAM 515 through the memory control circuit 523 to the head/disk control circuit 525. Inside the head/disk control circuit 525, the data to be written undergoes processing such as a required coding process and/or an error detection/correction information adding process. The data is further converted into write signals (not shown), then supplied to a writing element within the read/write head, and written onto the desired position of the recording medium as a distribution of directions of magnetization. When data writing onto the recording medium is completed, the processor-2 522 uses the command analysis/status display circuit 521 to make a display to the effect that data writing has been completed. When this display is recognized by the processor-1 511, the writing operation is completed.

According to the above configuration and operation, since the number of components in the application apparatus of the information read/write device, and memory capacities are reduced and since the number of data transfer operations in the application apparatus is also reduced, not only the processors forming part of the application apparatus but also data transfer paths can be reduced in throughput. These reductions provide advantages in terms of cost, electric power consumption, and size. Also, mounting the processor-1 511, the processor-2 522, the memory control circuit 523, and the head/disk control circuit 525, desirably, on one circuit substrate, or further desirably, in one package, makes it unnecessary for rectangular-wave digital signals of relatively large amplitude and high speed to be routed via a storage interface. A great advantage in terms of EMI suppression is also provided as a result.

If, for some reason, the processor-2 522 has failed to load the application program for the processor-1 511 or has been unable to confirm the validity of the application program, the processor-2 522 leaves the instruction execute operation of the processor-1 511 in a stopped state. At the same, the processor-2 522 selects the host interface circuit 520 as a fixed issuance source of the commands that the command analysis/status display circuit 521 accepts. In this case, the drive 599 operates in exactly the same manner as that of a conventional drive, in accordance only with the commands issued from the external host device connected to the storage interface 501. In this case, if the external host device is temporarily connected to the storage interface 501 and an application program to be executed by the processor-1 511 is written into a required recording region of the recording medium by issuing an appropriate command, original functions of the information read/write device according to the present invention can be recovered when the read/write device is restarted next time.

As heretofore described, according to this configuration, when an application program for the processor-1 511 is stored on the recording medium beforehand, execution of the application program allows the information read/write device to autonomously operate without depending on an external host. Also, if an application program for the processor-1 511 is not stored on the recording medium beforehand, the information read/write device operates in exactly the same manner as that of the conventional type controlled by the external host connected to a storage interface. Therefore, since an information read/write device having the above two operating functions under the same configuration can be manufactured, improvement of a mass-production effect makes it possible to reduce manufacturing costs and brings about an advantage in terms of costs.

Fourth Embodiment

Figure 6:
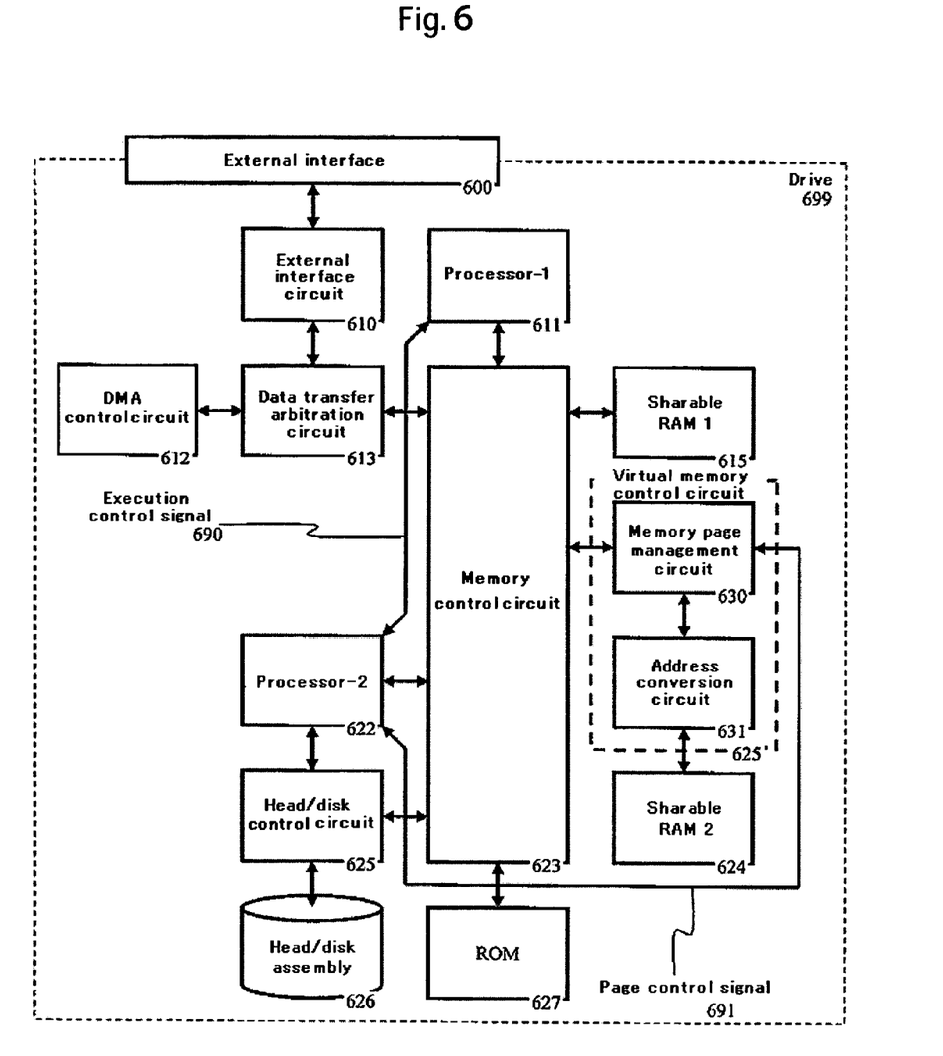
FIG. 6 is a diagram explaining a fourth configuration example of an information read/write device which uses the technology according to the present invention.

FIG. 6 is a diagram explaining a fourth configuration example of an information read/write device which uses the technology according to the present invention. In a drive 699, a processor-1 611 mainly executes the application programs (not shown) that are prestored within a sharable RAM-1 615 and as necessary, within a sharable RAM-2 624, and determines external functions of the drive 699. Also, a processor-2 622 mainly executes the read/write channel control program (not shown) and mechanism control program (not shown) that are prestored within a ROM 627, and controls a head/disk assembly 626 through a head/disk control circuit 625. In addition, the processor-1 611 can make random access to the sharable RAM-1 615 through a memory control circuit 623, and to the sharable RAM-2 624 through the memory control circuit 623, a memory page management circuit 630, and an address conversion circuit 631. Both processors exchange operational information and other information between each other through the sharable RAM-1 615 and the sharable RAM-2 624.

In this configuration, when the processor-1 611 accesses the sharable RAM-1 615, the logical address that the processor-1 611 transmits as an access request object to the memory control circuit 623 is used intact as a physical address on an access bus of the sharable RAM-1 615. However, the logical address transmitted to the memory control circuit 623 when the processor-1 611 accesses the sharable RAM-2 624 is converted into a physical address on an access bus of the sharable RAM-2 624 by the address conversion circuit 631. The conversion from the logical address into the physical address is managed by the memory page management circuit 630. The management of the address conversion will be described later in this Specification.

Also, when the processor-2 622 accesses the sharable RAM-1 615, the logical address that the processor-2 622 transmits as an access request object to the memory control circuit 623 is used intact as a physical address on the access bus of the sharable RAM-1 615. When the processor-2 622 accesses the sharable RAM-2 624, operation of a virtual memory control circuit 625' is bypassed and the logical address that the processor-2 622 transmits as the access request object to the memory control circuit 623 is also used intact as a physical address on the access bus of the sharable RAM-2 624 by the address conversion circuit 631.

The head/disk assembly 626 includes a disk-like recording medium (not shown), a read/write head (not shown), and a scanning element (not shown) that can scan any position on the recording medium by means of the read/write head. The sharable RAM-1 615, the sharable RAM-2 624, and the ROM 627 are connected to the memory control circuit 623, which arbitrates access requests from the processor-1 611, the processor-2 622, and a data transfer arbitration circuit 613, to the sharable RAM-1 615, the sharable RAM-2 624, and the ROM 627, and conducts actual access processes. The data transfer arbitration circuit 613 arbitrates access requests from the memory control circuit 623 and a DMA control circuit 612, and adjusts mutual communications bands and latency. In accordance with a request from the processor-1 611 or the like, an external interface circuit 610 outputs data from the drive 699 to an external device (not shown) connected to an external interface 600, or conversely, acquires signal information from the external device into the drive 699.

When the drive 699 is started by power-on or restarted by a resetting operation or the like, the processor-2 622 accesses the ROM 627 via the memory control circuit 623 and starts executing an initializing program (not shown) that is prestored within the ROM 627. At this time, the processor-1 611 has its instruction execution operation stopped by the execution control signal 690 sent from the processor-2 622. When initialization of internal resources of elements such as the head/disk assembly 626, the virtual memory control circuit 625' is completed by execution of the initializing program by the processor-2 622, an application program for the processor-1 611, pre-recorded in a required position on the recording medium, is loaded from the head/disk assembly 626 into the sharable RAM-1 615 by the processor-2 622. Next, the processor-2 622 checks contents of the application program and verifies that this program is a valid program which the processor-1 611 can execute.

When the application program for the processor-1 611 is successfully loaded and validity of the program is confirmed, the processor-2 622 restarts the instruction execute operation of the processor-1 611 through the execution control signal 690 sent to the processor-1 611. The processor-1 611 starts executing the application program that has been loaded into the sharable RAM-1 615. In this case, depending on the contents of the application program, the processor-1 611, after processing the signal information that has been acquired from the external interface 600, writes the signal information onto the recording medium, or after processing the information that has been read out from the recording medium, outputs the information to the external interface 600. Additionally, a user command within the drive 699 may be acquired through the external interface 600 and operation of the application program may be subject to a change or the like in accordance with the user command.

Operation of the virtual memory control circuit 625' is as follows. That is, the program that the processor-1 611 executes, and the data used for that program are basically stored in the sharable RAM-1 615. In this case, as mentioned above, the logical address specified to the memory control circuit 623 when the processor-1 611 accesses the sharable RAM-1 615 is also used intact as a physical address on the access bus of the sharable RAM-1 615. However, if, as a result of an increase in a quantity of program codes or in the amount of data handled, the amount of data to be temporarily stored into a memory exceeds a capacity of the sharable RAM-1 615, a virtual memory region having a capacity greater than the particular amount of shortage is reserved on the recording medium beforehand. Of all logical address spaces of the processor-1 611, only a logical address space associated with the virtual memory region is called "virtual memory space." The virtual memory region within the recording medium, the sharable RAM-2 624, and the virtual memory space defined above are each divided into "pages" that are a unit having a required common size. The virtual memory space and the internal virtual memory space of the recording medium are equal in size, these virtual memory spaces have respective pages associated at a rate of one to one, and this relationship is fixed. Also, associative relationships between the pages of the virtual memory spaces and pages of a physical address space on the sharable RAM-2 are dynamically managed by the memory page management circuit 630.

When the processor-1 611 issues an access request to either of the above two virtual memory spaces during execution of an application program and the page of the virtual memory space that includes the logical address specified at that time is not associated with an appropriate page of the physical address space on the sharable RAM-2 624, the memory page management circuit 630 detects the access request and then sends a page control signal 691 to the processor-2 622 to notify this processor of detection results. After being notified of the detection results, the processor-2 622 sends the execution control signal 690 to the processor-1 611 to suspend current processing until data of the page including that logical address has been loaded from the virtual memory region into the sharable RAM-2 624, or to execute only other processing that does not require access to the specified logical address.

Next the memory page management circuit 630 notifies the processor-2 622 not only of the physical address of the above page not associated with the virtual memory space (this page is referred to as an empty page) with respect to the appropriate page of the physical address space on the sharable RAM-2 624, but also the page position of the virtual memory region that is associated with the access-requested page of the virtual memory space. Additionally, the memory page management circuit 630 associates the page that includes access-requested logical addresses, and the empty page, and notifies the address conversion circuit 631 of both the first logical address of the page including the access-requested logical addresses, and the first physical address of the empty page. In accordance with the thus-obtained information, the address conversion circuit 631 subsequently operates to convert the access request to the particular page of the virtual memory space, into an access request associated with the physical address of the empty page. Simultaneously with the conversion, the processor-2 622 calculates the physical storage position on the recording medium that is associated with the particular page. In accordance with calculation results, the processor-2 622 operates to move the read/write head to a desired position on the recording medium through the head/disk control circuit 625.

Furthermore, the processor-2 622 notifies the memory control circuit 623 of the physical address of the foregoing empty page, as a position in the sharable RAM-2 624 where data is to be read out from the virtual memory region on the recording medium. After a while, when the read/write head arrives at the desired position on the recording medium, a reading element within the read/write head outputs a distribution of directions of magnetization on the recording medium, as read signals (not shown). These read signals, after undergoing a required decoding process, error detection/correction, and/or other processing in the head/disk control circuit 625, are sequentially transferred to the memory control circuit 623 and finally, stored into the page of the sharable RAM-2 624 that has been associated with the appropriate page of the virtual memory space beforehand. After the data has been completely stored into the sharable RAM-2 624, the processor-2 622 sends the execution control signal 690 to the processor-1 611, thus instructing this processor to restart previously suspended processing that requires access to the relevant logical address.

When the processor-1 611 issues an access request to the virtual memory space and the page thereof that includes the logical address specified at that time is already associated with an appropriate page of the physical address space on the sharable RAM-2 624, the memory page management circuit 630 records only the fact that the access request has been issued to the above page of the virtual memory space. Also, the address conversion circuit 631 converts the logical address into physical address form in accordance with the existing associative relationships between logical and physical addresses, and processes the access request. The virtual memory control circuit 625' and the processor-2 622 continue the above operation until all empty pages present on the sharable RAM-2 624 have been consumed.

When the processor-1 611 continues the execution of the application program, all empty pages present on the sharable RAM-2 624 are eventually consumed. When the processor-1 611 further issues an access request to the virtual memory space and the page of the virtual memory space that includes the logical address specified at that time is not associated with an appropriate page of the physical address space on the sharable RAM-2 624, the memory page management circuit 630 detects the access request and then sends the page control signal 691 to the processor-2 622 to notify this processor of detection results.

After being notified of the detection results, the processor-2 622 sends the execution control signal 690 to the processor-1 611 to suspend current processing until data of the page including that logical address has been loaded from the virtual memory region into the sharable RAM-2 624, or to execute only other processing that does not require access to the specified logical address. At this time, in order to write back the data of the page within the sharable RAM-2 624 into the virtual memory region, the memory page management circuit 630 next cancels the associative relationship between the virtual memory space and the page whose frequency of access is the lowest of all pages within the sharable RAM-2 624, and changes the appropriate page of the sharable RAM-2 624 into an empty page. In addition, a physical address of this empty page and the page position of the virtual memory region that is associated with the previously associated page of the virtual memory space are notified to the processor-2 622.

The processor-2 622 calculates the physical storage position on the recording medium that is associated with the particular page, and in accordance with calculation results, the processor-2 622 operates to move the read/write head to a desired position on the recording medium through the head/disk control circuit 625. Furthermore, the processor-2 622 notifies the memory control circuit 623 of the physical address of the foregoing empty page within the sharable RAM-2 624, as a storage position for the data of the page that is to be written back into the virtual memory region. After a while, when the read/write head arrives at the desired position on the recording medium, data to be written is sequentially transferred from the sharable RAM-2 624 to the head/disk control circuit 625 through the memory control circuit 623. The data to be written, after undergoing a required decoding process, error detection/correction, and/or other processing in the head/disk control circuit 625, is converted into read signals (not shown), then supplied to the writing element of the read/write head, and written onto the desired position on the recording medium as a distribution of directions of magnetization. When data writing onto the recording medium is completed, the virtual memory control circuit 625 and the processor-2 622 associate a released page of the sharable RAM-2 624, with a previously access-requested page of the virtual memory space, and makes the processor-1 611 restart suspended processing that requires access to the relevant address.

According to the above configuration and operation, since the number of components in the application apparatus of the information read/write device, and memory capacities are reduced and since the number of data transfer operations in the application apparatus is also reduced, not only the processors forming part of the application apparatus but also data transfer paths can be reduced in throughput. These reductions provide advantages in terms of cost, electric power consumption, and size. Also, mounting the processor-1 611, the processor-2 622, the memory control circuit 623, and the head/disk control circuit 625, desirably, on one circuit substrate, or further desirably, in one package, makes it unnecessary for rectangular-wave digital signals of relatively large amplitude and high speed to be routed via a storage interface. A great advantage in terms of EMI suppression is also provided as a result. Additionally, since a person who creates the application programs executed by the processor-1 611 becomes able to easily use a wide logical memory space without having to be aware of a method for managing the virtual memories, development costs for the application apparatus of the information read/write device can be reduced and this yields an advantage in terms of costs.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An information read/write device, comprising:
    a first processor and a second processor;
    a recording medium to retain information using a distribution of physical states;
    recording means for inciting changes in a local physical state of said recording medium;
    reading means for detecting the local physical state of said recording medium;
    scanning means for scanning a desired position on said recording medium via said recording means and said reading means;
    write signal processing means that conducts required processing on information to be written and generates a signal for driving said recording means;
    read signal processing means by which the signal obtained from said reading means is provided with inverse processing to processing provided by said write signal processing means, and restores read information to its original form;
    memory means that is random-accessible from said first processor and said second processor; and
    a memory control circuit that arbitrates access requests from said first and second processors to said memory means and conducts access processing with respect to said memory means;
    wherein:
    said first processor instructs said second processor to write information onto, or read information from, said recording medium;
    said second processor controls said scanning means, said write signal processing means, and said read signal processing means; and
    the information to be written or the read information is stored into said memory means.

2. The information read/write device according to claim 1, wherein said second processor controls instruction execution operation of said first processor.

3. The information read/write device according to claim 2, wherein said second processor, when instruction execution operation thereof is controlled by said first processor, operates to mechanically protect said writing means or said reading means.

4. The information read/write device according to claim 2, wherein said second processor, when instruction execution operation thereof is controlled by said first processor, operates to write onto said recording medium the information stored within a required position of said memory means.

5. The information read/write device according to claim 1, further including: first input/output means that inputs/outputs the information which the program executed by said first processor is to process, and second input/output means that instructs said information read/write device to write information onto, or read information from, said recording medium; wherein
    the program executed by said first processor is written into a required position of said recording medium by use of said second input/output means.

6. The information read/write device according to claim 1, wherein said first processor, said second processor, said memory control circuit, said write signal processing means, and said read signal processing means are all mounted on one circuit substrate or in one package.

7. The information read/write device according to claim 1, wherein:
    part or all of said memory means includes the set of pages that has a required capacity;
    page management means for managing usage states of the pages, and address conversion means for adding the quantity of offsets that varies from page to page, to logical addresses in said first processor, and using these logical addresses as physical addresses in said memory means; and
    in accordance with a request from said page management means, said second processor writes the information stored within said memory means, onto said recording medium, or reads information from said recording medium and stores the information into said memory means.

8. An information read/write device, comprising:
    a first processor and a second processor;
    a recording medium to retain information using a distribution of physical states;
    a recording module to incite changes in a local physical state of said recording medium;
    a reading module to detect the local physical state of said recording medium;
    a scanning module to scan a desired position on said recording medium via said recording module and said reading module;
    a write signal processing module that conducts required processing on information to be written and generates a signal for driving said recording module;
    a read signal processing module by which the signal obtained from said reading module is provided with inverse processing to processing provided by said write signal processing module, and restores read information to its original form;
    a memory module that is random-accessible from said first processor and said second processor; and a memory control circuit that arbitrates access requests from said first and second processors to said memory module and conducts access processing with respect to said memory module;

wherein:

said first processor instructs said second processor to write information onto, or read information from, said recording medium;

said second processor controls said scanning module, said write signal processing module, and said read signal processing module; and the information to be written or the read information is stored into said memory module.

9. The information read/write device according to claim 8, wherein said second processor controls instruction execution operation of said first processor.

10. The information read/write device according to claim 9, wherein said second processor, when instruction execution operation thereof is controlled by said first processor, operates to mechanically protect said writing module or said reading module.

11. The information read/write device according to claim 9, wherein said second processor, when instruction execution operation thereof is controlled by said first processor, operates to write onto said recording medium the information stored within a required position of said memory module.

12. The information read/write device according to claim 8, further including:

a first input/output module that inputs/outputs the information which the program executed by said first processor is to process, and second input/output module that instructs said information read/write device to write information onto, or read information from, said recording medium;

wherein the program executed by said first processor is written into a required position of said recording medium by use of said second input/output module.

13. The information read/write device according to claim 8, wherein said first processor, said second processor, said memory control circuit, said write signal processing module, and said read signal processing module are all mounted on one circuit substrate or in one package.

14. The information read/write device according to claim 8, wherein:

part or all of said memory module includes the set of pages that has a required capacity;

a page management module for managing usage states of the pages, and address conversion module for adding the quantity of offsets that varies from page to page, to logical addresses in said first processor, and using these logical addresses as physical addresses in said memory module; and in accordance with a request from said page management module, said second processor writes the information stored within said memory module, onto said recording medium, or reads information from said recording medium and stores the information into said memory module.

* * * * *